US007826442B2

(12) United States Patent
Lee

(10) Patent No.: US 7,826,442 B2
(45) Date of Patent: Nov. 2, 2010

(54) VOIP TERMINAL SUPPORTING OPTIMAL INTERCOM SERVICE AND SESSION CONNECTING METHOD THEREOF

(75) Inventor: Dae-Hyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 11/902,205

(22) Filed: Sep. 19, 2007

(65) Prior Publication Data

US 2008/0123632 A1 May 29, 2008

(30) Foreign Application Priority Data

Nov. 28, 2006 (KR) .................... 10-2006-0118435

(51) Int. Cl.
H04L 12/66 (2006.01)
(52) U.S. Cl. .................... 370/352; 370/390; 370/432
(58) Field of Classification Search ............. 370/352, 370/390, 432
See application file for complete search history.

(56) References Cited

U.S. PATENT DOCUMENTS

| 6,721,319 | B1 * | 4/2004 | Amano et al. ............. 370/390 |
| 7,453,831 | B2 * | 11/2008 | Dorenbosch et al. ........ 370/270 |
| 2003/0153341 | A1 * | 8/2003 | Crockett et al. ............ 455/519 |
| 2006/0067323 | A1 * | 3/2006 | Beck et al. ............... 370/395.2 |
| 2007/0237140 | A1 * | 10/2007 | Sugino et al. ............. 370/389 |
| 2008/0069318 | A1 * | 3/2008 | McClung ................ 379/88.22 |
| 2008/0151874 | A1 | 6/2008 | Wynn |

FOREIGN PATENT DOCUMENTS

| KR | 2001-0079255 | 8/2001 |
| KR | 2004-0048252 | 6/2004 |
| KR | WO 2004/105342 | 12/2004 |
| KR | 2005-0060988 | 6/2005 |
| KR | 2006-0001755 | 1/2006 |
| KR | 10-2006-0023130 | 3/2006 |
| KR | 10-2006-0070328 | 6/2006 |

OTHER PUBLICATIONS

Korean Decision of Grant issued on Jan. 25, 2008, corresponding to Korean Patent Application No. 2006-0118435.
The Office Action from the Korean Intellectual Property Office issued in Applicant's corresponding Korean Patent Application No. 2006-118435 dated Sep. 28, 2007.
Network Working Group Request for Comments: 3170 by Quinn et al., "IP Multicast Applications: Challenges and Solutions", University of California, Santa Barbara, Sep. 2001.
Network Working Group Request for Comments: 919 by Mogul, "Broadcasting Internet Datagrams", Stanford University, Oct. 1984.
Link: http://en.wikipedia.org/wiki/IP_Multicast, Sep. 19, 2007.

* cited by examiner

Primary Examiner—Quynh H Nguyen
(74) Attorney, Agent, or Firm—H.C. Park & Associates, PLC

(57) ABSTRACT

In a Voice over Internet Protocol (VoIP) terminal supporting an optimal intercom service and a session connecting method thereof, a VoIP terminal announcement module of the VoIP terminal performs an announcement process by transmitting address information of the VoIP terminal to other terminals located in a same network, and acquires address information of said other terminals. If the address information acquired by the VoIP terminal announcement module includes information of a counterpart terminal called by a user, a call controller sends a session connecting invite message directly to said counterpart terminal using the acquired address information of the counterpart terminal. As a result, it is possible to provide intercom service to a user without going through an external SIP proxy server.

17 Claims, 9 Drawing Sheets

FIG. 4

| MESSAGE FIELD | SIZE (Byte) | DESCRIPTION |
|---|---|---|
| MESSAGE ID | 2 | 0x01-ANNOUNCEMENT<br>0x02-REPLY<br>0x10-REQUEST<br>0x20-RESPONSE |
| IDENTIFICATION | 8 | INTERNAL IDENTIFICATION.<br>ID GIVEN BY PROVIDER OR LAST<br>FOUR DIGITS OF TELEPHONE NUMBER<br>+ RANDOM NUMBER(MAXIMUM 4 DIGITS) |
| IP ADDRESS TYPE | 2 | INPUT IPV4 AS 'V4' CHARACTER TYPE<br>INPUT IPV6 AS 'V6' CHARACTER TYPE |
| IP ADDRESS | 4 OR 16 | SET AS VARIABLE ACCORDING TO<br>IP ADDRESS TYPE VALUE<br>EXPRESS AS HEXADECIMAL VALUE |
| SIP PORT NUMBER | 4 | PORT NUMBER EXPRESS AS<br>HEXADECIMAL VALUE |
| STATUS | 2 | STATUS OF INTERCOM DEVICE |
| CHECKSUM | 2 | CHECKSUM DATA |

VOIP TERMINAL SUPPORTING OPTIMAL INTERCOM SERVICE AND SESSION CONNECTING METHOD THEREOF

CLAIM OF PRIORITY

This application makes reference to, incorporates the same herein, and claims all benefits accruing under 35 U.S.C. §119 from an application for VoIP TERMINAL SUPPORTING OPTIMAL INTERCOM SERVICE AND SESSION CONNECTING METHOD THEREOF earlier filed in the Korean Intellectual Property Office on the 28 Nov. 2006 and there duly assigned Serial No. 2006-0118435.

BACKGROUND OF THE INVENTION

1. Technical Field

The present invention relates to a Voice over Internet Protocol (VoIP) terminal supporting an optimal intercom service and a session connecting method thereof.

2. Related Art

The general concept of Voice over Internet Protocol (VoIP) will be briefly discussed as follows.

VoIP can be defined as a technology which enables an existing data communication packet network to be used for Internet phones. That is, VoIP is a communication service technology for converting voice data into an Internet protocol data packet in order to support telecommunication in the data communication network as in a common telecommunication network.

As a major advantage of the VoIP Internet technology, it is possible to realize a telecommunication service using an existing IP network as it stands, thereby providing telephone users with long distance and overseas call services on Internet and intranet environments. Accordingly, the telephone users can enjoy the long distance and overseas call services while paying only local call rates.

The VoIP was provided by the VoIP forum through endeavors of major equipment companies, such as Cisco, Vocaltec, 3Com and NetSpeak, for the purpose of encouraging the use of a standard, such as ITU-T and H.323, which transmits voice, and optionally with video, using IP on the Internet or an intranet. In order to promote directory service standards, the VoIP forum also enabled users to locate other users, and to use touchphone signals for automatic telephone exchanges and voice mails.

In addition to the original IP function of the VoIP, Real Time Protocol (RTP) is used to support timely arrival of packets. If a conventional public network is used, Quality of Service (QoS) support for telecommunication is difficult due to best-off service characteristics. Accordingly, it is possible to provide higher quality VoIP services by using a private network which is managed by a separate company or an Internet Telephony Service Provider (ITSP).

In the case of the conventional Plain Old Telephone Service (POTS) (e.g., PSTN), a plurality of telephones can be used in a single home based upon a bridge function. An intercom service has also been provided to users using the same. Recently, as POTS phones used at home have been replaced with VoIP phones with the arrival of VoIP markets, consumers have requested conventional POTS phone functions together with additional VoIP phone functions. However, the intercom function has not been enabled on such a VoIP phone.

SUMMARY OF THE INVENTION

The present invention has been developed to solve the foregoing problems seen in the prior art. Therefore, the present invention provides a Voice over Internet Protocol (VoIP) terminal supporting an intercom service and a session connecting method using the same VoIP terminal. The VoIP terminal performs a terminal announcement process by transmitting its own address information to other terminals located in the same network so as to acquire address information of the other terminals. The VoIP terminal then sends a session connecting invite message to a counterpart terminal using the acquired address information.

According to an aspect of the invention, a VoIP terminal supporting an intercom service comprises: a VoIP terminal announcement module for performing an announcement process by transmitting address information of the VoIP terminal to other terminals located in the same network, and for acquiring address information of the other terminals; and a call controller which, if the address information acquired by the VoIP terminal announcement module includes information of a counterpart terminal called by a user, sends a session connecting invite message directly to the counterpart terminal using the acquired address information of the counterpart terminal.

The VoIP terminal can further include an intercom terminal table for storing the address information of the other terminals acquired by the VoIP terminal announcement module. Herein, the intercom terminal table has information relative to the terminals, the information comprising Identification (ID) information, IP address information, SIP port information, status information, or a combination thereof.

The VoIP announcement module preferably multicasts an address information request message, including the address information of the VoIP terminal, and receives an address information response message, including the address information of the other terminals in the same network, so as to acquire the address information of the other terminals.

Each of the address information request message and the address information response message preferably includes at least one of a message ID field, a terminal ID field, a terminal IP address type field, a terminal address field, an SIP port number field, a status information field, and a checksum field. In this case, it is preferable that the address information request message and the address information response message be divided based upon a code value of the message ID field.

The VoIP terminal announcement module can send a session connecting invite message to the counterpart terminal via an external proxy server if the address information of the counterpart terminal called by the user is not acquired. In the event that the VoIP terminal is powered on, the VoIP terminal announcement module can carry out a terminal announcement process.

The VoIP terminal preferably further includes a user SIP module which displays information relative to the other terminals in the same network, acquired by the terminal announcement process, and receives a call origination request for at least one of the information-displayed terminals.

According to another aspect of the invention, a VoIP network supporting an intercom service comprises: a plurality of VoIP terminals, each performing an announcement process by transmitting its own address information to other terminals located in a same network, acquiring address information of the other terminals, and sending a session connecting invite message directly to a counterpart terminal using the acquired address information of the counterpart terminal; and an external proxy server which, upon receiving a session connecting invite message with respect to an external terminal from at least one of the VoIP terminals, searches for address information of the external terminal, and controls a call session connection between the VoIP terminal and the external terminal using the address information of the external terminal.

The VoIP terminal preferably includes an intercom terminal table having information relative to the terminals of the VoIP network, the information comprising ID information, IP address information, SIP port information, status information, or a combination thereof. The VoIP terminal multicasts an address information request message including the address information thereof, and receives an address information response message including the address information of the other terminals so as to acquire the address information of the other terminals.

Each of the address information request message and the address information response message preferably includes at least one of a message ID field, a terminal ID field, a terminal IP address type field, a terminal address field, an SIP port number field, a status information field, and a checksum field.

According to a further aspect of the invention, a method of connecting a VoIP session supporting an intercom service comprises: at a VoIP terminal, performing an announcement process by transmitting address information of the VoIP terminal to other terminals located in the same network, and acquiring address information of the other terminals; and, at the VoIP terminal, if the address information acquired by the VoIP terminal announcement module includes information relative to a counterpart terminal called by a user, sending a session connecting invite message directly to the counterpart terminal using the acquired address information of the counterpart terminal.

In this case, the announcement process can include, at the VoIP terminal, broadcasting an announcement message and determining whether or not a reply message responsive to the announcement message exists; at the VoIP terminal, if a reply message responsive to the announcement message exists, multicasting an address information request message including its own terminal information; and, when a network receives the address information request message, at one or more terminals belonging to the network, transmitting to the VoIP terminal an address information response message including address information related to the terminals.

The method preferably further includes, at the VoIP terminal, storing in an intercom terminal table the address information of the terminals included in the received address information response message.

The intercom terminal table preferably has information of terminals, the information being at least one of ID information, IP address information, SIP port information, and status information.

Each of the address information request message and the address information response message preferably includes at least one of a message ID field, a terminal ID field, a terminal IP address type field, a terminal address field, an SIP port number field, a status information field, and a checksum field.

The method can further include, at the VoIP terminal, if address information matching the information of said counterpart terminal called by the user is not acquired, sending a session connecting invite message to the counterpart terminal via an external proxy server.

The method preferably further includes, at the VoIP terminal, displaying information relative to the other terminals in the same network, acquired by the terminal announcement process, and receiving a call origination request for at least one of the information-displayed terminals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a table illustrating a packet structure of a message which a VoIP terminal uses in the announcement process;

DETAILED DESCRIPTION OF THE INVENTION

Reference will now be made in detail to the Voice over Internet Protocol (VoIP) terminal supporting an optimal intercom service, and the session connecting method thereof, according to preferred embodiments of the invention, examples of which are illustrated in the accompanying drawings.

Figure 1:
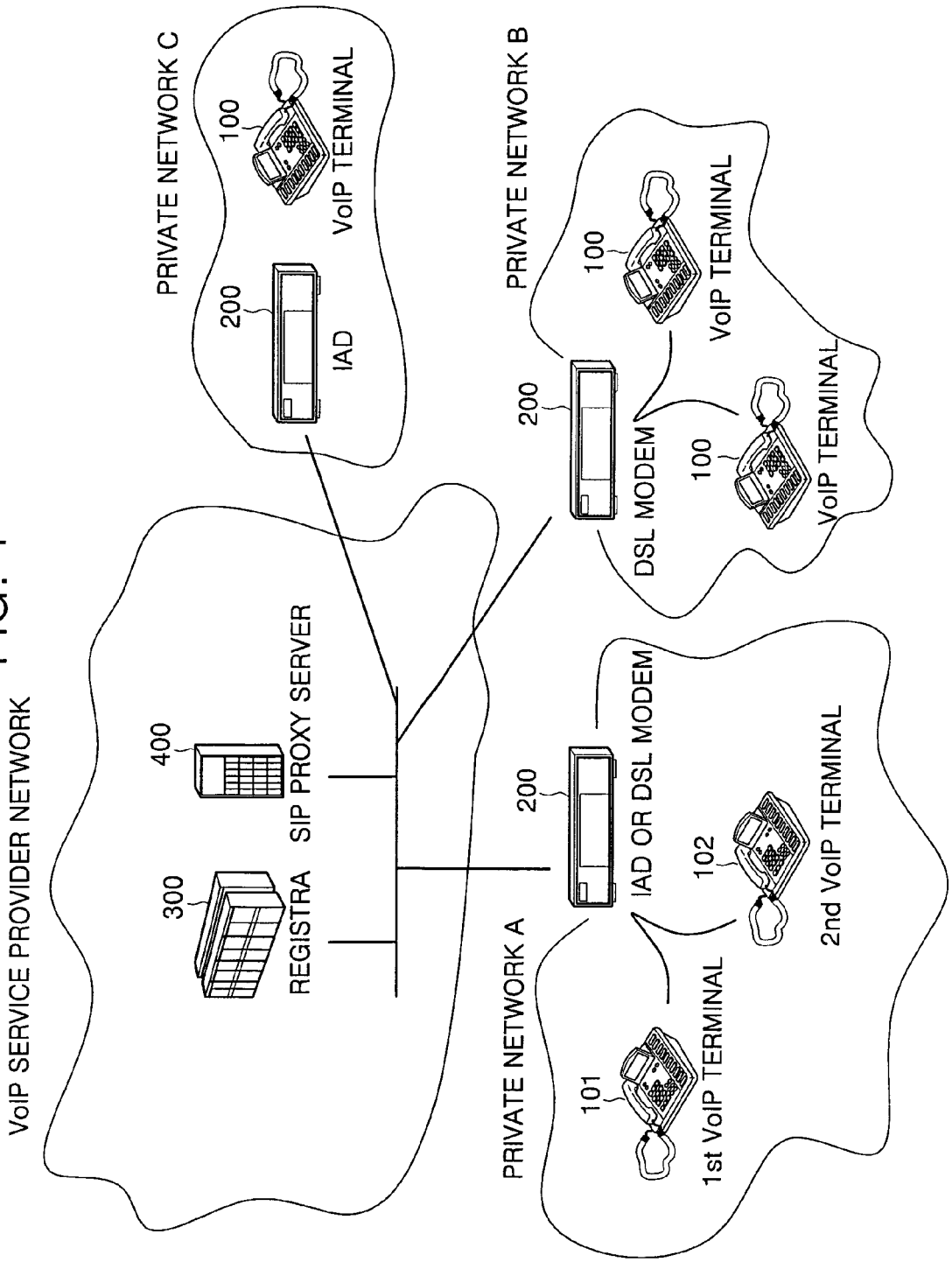
FIG. 1 is a conceptual view of a Voice over Internet Protocol (VoIP) network supporting an intercom service according to an embodiment of the invention.

FIG. 1 is a conceptual view of a VoIP network supporting an intercom service according to an embodiment of the invention.

As shown in FIG. 1, a private network includes a plurality of VoIP terminals 100 and an Integrated Access Device (IAD) modem 200 or a Digital Subscriber Line (DSL) modem 200, and a VoIP service provider network includes a registra 300 and a Session Initiation Protocol (SIP) proxy server 400.

Each respective VoIP terminal 100 is an entity which generates an SIP session connecting invite message, and which responds to a received SIP session connecting invite message. The VoIP terminal 100 acts as a user agent server when handling a received SIP invite message. On the other hand, the VoIP terminal 100 acts as a user agent client when generating a new SIP invite message.

The IAD modem 200, defined as an integrated access device, is installed in a subscriber home, and acts as a subscriber gateway while providing voice service through an analog Plain Old Telephone Service (POTS) port and an Ethernet Internet service. That is, the IAD modem 200 connects a telephone with a Local Area Network (LAN) device.

The SIP proxy server 400 corresponds to a call server in that it connects a session between two VoIP terminals 100. The SIP proxy server 400 generates a session connecting invite message in place of the VoIP terminal 100, and acts as an intermediate entity in place of a client and a server, in order to route a session connecting invite message to an entity which is located near a destination.

The registra 300 is a server for receiving a register message, necessary for the announcement of a terminal, and provides the service of locating the VoIP terminal in its own domain using information which is included in the register message.

Each respective SIP based VoIP terminal 100 establishes a session with another VoIP terminal 100 in another network by registering in the SIP registra 300, and by transmitting a session connecting invite message to the SIP proxy server 400 in an external network. The process of supporting an intercom service using networks will be described as follows.

It will be assumed that an intercom service is established between a first VoIP terminal 101 and a second VoIP terminal 102 in a private network A. The first VoIP terminal 101 transmits a session connecting invite message to the SIP proxy server 400 in the external network via the IAD or DSL modem 200. The first VoIP terminal 101 sends a telephone number of a receiving terminal to the SIP proxy server 400. Then, the SIP proxy server 400 determines that the receiving terminal is the second VoIP terminal 102 of the private network A, and transmits the session connecting invite message to the second VoIP terminal 102.

According to the VoIP intercom network as shown in FIG. 1, the SIP proxy sever 400 is used even for intercom service between VoIP terminals of the same network. However, the drawbacks are that the SIP proxy server 400 of the external network might suffer from excessive network load, and a session connecting process might be delayed. Accordingly, the present invention proposes an advance to overcome these drawbacks using a VoIP terminal as illustrated in FIG. 2.

Figure 2:
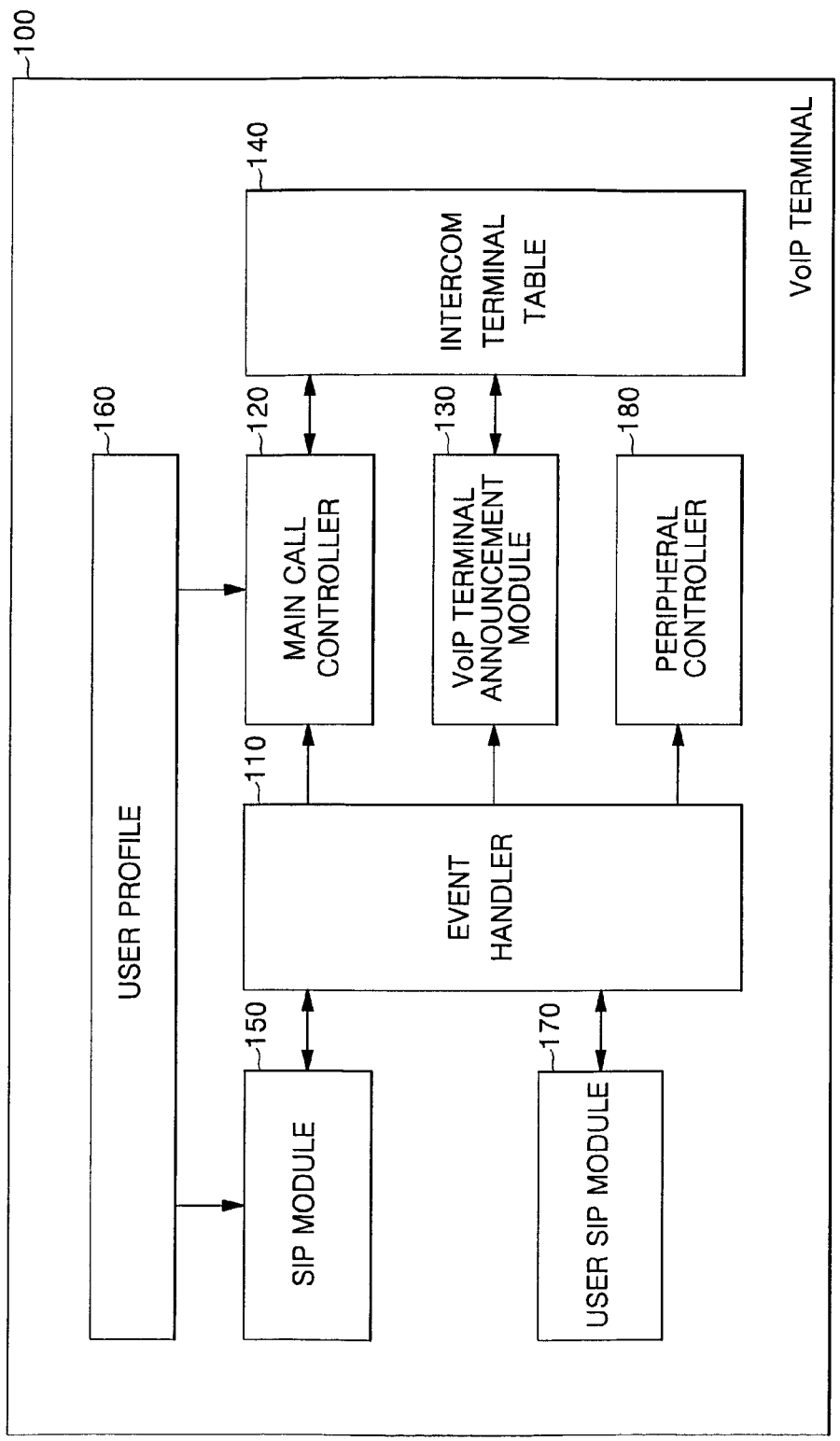
FIG. 2 is a block diagram illustrating the internal structure of a VoIP terminal according to another embodiment of the invention.

FIG. 2 is a block diagram illustrating the internal structure of a VoIP terminal according to another embodiment of the invention.

Referring to FIG. 2, the VoIP terminal 100 of the invention includes an event handler 110, a main call controller 120, a VoIP terminal announcement module 130, an intercom terminal table 140, an SIP module 150, a user profile 160, a user SIP module 170, a peripheral controller 180, and so on.

The event handler 110 is an element for handling and scheduling events which occur in the VoIP terminal 100. For example, in the event of supplying power to the VoIP terminal 100, the event handler 110 controls the VoIP terminal announcement module 130 to multicast a terminal announcement message or an announcement message.

In response to the control of the event handler 110, the VoIP terminal announcement module 130 multicasts an announcement message. Furthermore, the VoIP terminal announcement module 130 receives a reply message in response to the multicast announcement message, and stores data of other VoIP terminals, which can act as an intercom, in the intercom terminal table 140.

In response to the user calling for another VoIP terminal, the main call controller 120 searches the intercom terminal table 140 before transmitting a session connecting invite message to the external SIP proxy server 400. If data of a call receiving VoIP terminal, which the user wants, exist in the intercom terminal table 140, the main call controller 120 generates a session connecting invite message by itself using the data in the intercom terminal table 140.

The intercom terminal table 140 is a storage area of VoIP terminals which are located in the same private network, and which can act as an intercom. The structure of the intercom terminal table will be described in greater detail later with reference to FIG. 5.

The user SIP module 170 is a module for executing a preset application to be provided to the user. Specifically, the user SIP module 170 of the invention provides functions which provide a more convenient intercom service to the user. That is, the user SIP module 170 outputs on a display (not shown) data of other VoIP terminals in the network acquired by a procedure of terminal announcement. The user checks the output data of the terminals, and selects via key buttons (not shown) or other interfaces a terminal with which the user wants to have intercommunication. The user SIP module 170 can provide a more convenient intercom service to the user by sending, to the event handler 110, an intercom call input for the selected terminal.

The user profile 160 is a storage area of environment data of the VoIP terminal 100. The environment data include a session connection-related profile and an SIP-related profile.

Finally, the peripheral controller 180 controls peripheral devices of the VoIP terminal 100, such as the display, the key buttons, a microphone, a speaker, a camera and a battery. While the peripheral devices may have their own controllers, such an arrangement is not essential in the invention. Accordingly, the respective controllers are summarily indicated by the peripheral controller 180.

Figure 3:
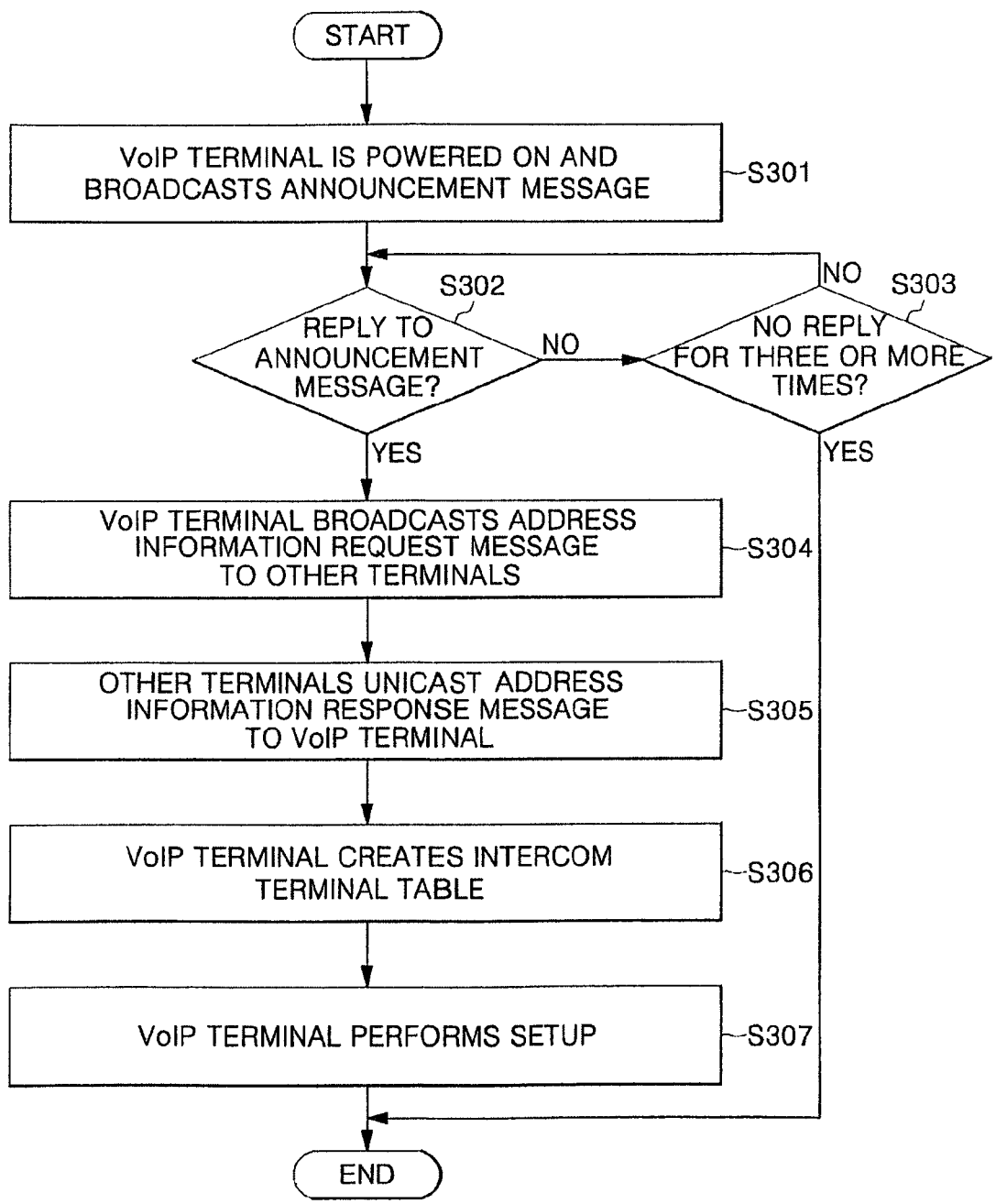
FIG. 3 is a flowchart of an announcement process of a VoIP terminal according to a further embodiment of the invention.

FIG. 3 is a flowchart of an announcement process of a VoIP terminal according to a further embodiment of the invention.

In the case where a plurality of VoIP terminals 100 are located in a single private network, the VoIP terminals 100 perform announcement and detection procedures in order to acquire address information relative to each other. Herein, such procedures will be generally referred to as a terminal announcement process or an "announcement process."

In step S301, when a first VoIP terminal 101 is powered on, it starts broadcasting an announcement message. This procedure can be indicated by a signal reporting that the first VoIP terminal 101 has newly entered the private network.

In step S302, the first VoIP terminal 101 detects a message replying to the announcement message. This message is defined as a terminal announcement reply message or simply a "reply message." In this embodiment, in step S303, it is preferable to check for a reply message three times or more in order to compensate for transmission/reception errors in step S303.

If there is a reply message to the broadcast announcement message as a result of steps S301 and S302, the first VoIP terminal 101 can recognize a second VoIP terminal 102 which can support an intercom service. Then, the first VoIP terminal 101 multicasts an address information request message, including terminal information, in step S304. In this case, the terminal data include an ID address, an SIP port, Identification (ID) and the like relative to the terminal.

When the second VoIP terminal 102 receives the data of the first VoIP terminal 101, it unicasts an address information response message to the first VoIP terminal 101 in step S305. The address information response message includes data of the second VoIP terminal 102.

The first VoIP terminal 101 extracts address information of the second VoIP terminal 101 from the address information response message, thereby creating an intercom terminal table 140 in S306. After creating the intercom terminal table 140, the first VoIP terminal 101 sets up to perform intercommunication in step S307.

This embodiment has been discussed in terms of the VoIP terminal performing the terminal announcement process when it is powered on because it is more preferable to perform the terminal announcement process simultaneously with a process of Dynamic Host Configuration Protocol (DHCP). However, the terminal announcement process of the invention is not limited to such a case of powering on the VoIP terminal.

FIG. 4 is a table illustrating a packet structure of a message which a VoIP terminal uses in the announcement process.

The messages used in the announcement process of FIG. 3 can be generally divided into four types of messages, that is, the announcement message in S301, the replay message in step S302, the address information request message in step S304 and the address information response message in step S305.

According to the invention, packets of the four messages have the same structure, and the VoIP terminal 100 identifies a respective message using ID field information of a respective packet. The structure of the packet will be described as follows.

As shown in FIG. 4, a message used in the announcement process may include a message ID field, a terminal ID field, a terminal IP address type field, a terminal IP address field, an SIP port field, a status field, a checksum field, and the like.

According to the invention, the message ID field is designed to have a two (2) byte size. As described above, the four types of messages are identified according to message ID fields. For example, a message having a hexadecimal value of 0x01 as a message ID field corresponds to an announcement message. A message ID field of 0x02 indicates a reply message, and a message ID field of 0x10 indicates a request message. Finally, a message ID field of 0x20 indicates a response message.

The terminal ID field corresponds to a specific area for storing an ID of a terminal, which transmits/receives a message. In the present invention, the terminal ID field is preferably composed of 8 bytes. In addition, the terminal ID field may be given by a provider or by combining the last four digits of a telephone number with random numbers. The random numbers may be one to four digits, so that the terminal ID field can have a value ranging from a minimum of 5 digits to a maximum of 8 digits.

The IP address type field indicates the protocol of an IP address, which will be included in this message. The IP address type field may be composed of two (2) bytes. A "V4" value of an IP address type field indicates that the IP address type field includes address information according to IPv4. In addition, a "V6" value of an IP address type field indicates that the IP address type field includes address information according to IPv6.

The IP address field has a size of 4 or 16 bytes. The IP address field will have a 4 byte size in the case of using an IPv4 address system, and a 16 byte size in the case of using an IPv6 address system.

The SIP port number field is a storage area for a port number which the VoIP terminal will use in an SIP telecommunication, and it has a four (4) byte size. In general, the SIP port number is 5060.

The status field has a two (2) byte size, and corresponds to a predetermined area used to notify the current status. The checksum field is a predetermined area for storing specific data which are used for error checking of the message, and may have a 2 byte size. A checksum error checking method is known in the art, and thus will not be described further.

Figure 5:
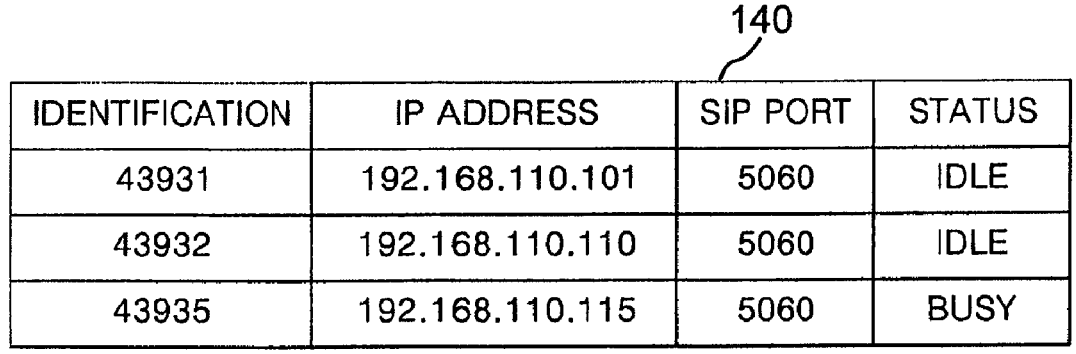
FIG. 5 is a diagram illustrating an exemplary intercom terminal table included in a VoIP terminal for carrying out intercom and external call processes.

FIG. 5 is a diagram illustrating an exemplary intercom terminal table included in a VoIP terminal for carrying out intercom and external call processes.

The intercom terminal table 140 is a database wherein the VoIP terminal 100 writes a result of the announcement process. The VoIP terminal 100 acquires data of the VoIP terminal 100, which is located in the same private network, by receiving an address information response message, and creates a database necessary to carry out an intercom control process of the invention using data of the VoIP terminal 100.

As shown in FIG. 5, the intercom terminal table 140 of the VoIP terminal 100 includes identification (ID), IP address, SIP port and status relative to VoIP terminals.

The ID item is a predetermined item with which terminals of the same private network are identified. The ID item can be acquired by extracting a terminal ID field from the address information response message.

The IP address item is a predetermined area which stores IP address values of terminals. Likewise, the VoIP terminal 100 can create the IP address item by extracting an IP address field and an IP address type field value from the address information response message.

The SIP port item is a predetermined storage area of port numbers which are used by terminals listed in the intercom terminal table for SIP session connection. The SIP port item can be created with reference to predetermined values which are stored in an SIP port number field of the address information response message.

The status item is a storage area of telecommunication information which indicates whether a respective terminal is in a telecommunication. That is, telecommunication information indicates whether a terminal is in an idle state or a busy state. Fields necessary for creating the status item are also included in the address information response message.

It is apparent that the intercom terminal table shown in FIG. 5 includes three (3) records at present. This shows that three terminals are located in the private network where the subject VoIP terminal is located. IDs of the three VoIP terminals are 43931, 43932 and 43935, respectively.

According to the ID creating method as illustrated with reference to FIG. 4, it is apparent that 4393x are the last digits of the ID of a respective terminal. Of course, random numbers 1, 2 and 5, corresponding to X, are combined with the last digits to create respective IDs to be used in the private network.

The IP addresses of the terminals are 192.168.110.101, 192.168.110.110 and 192.168.110.115. All of the SIP ports are 5060, which indicate a well known portion for using the SIP. In addition, examining the terminal status item, it can be appreciated that only one terminal having 43935 as the ID is in telecommunication (busy), while the remaining two terminals are on standby (idle).

Figure 6:
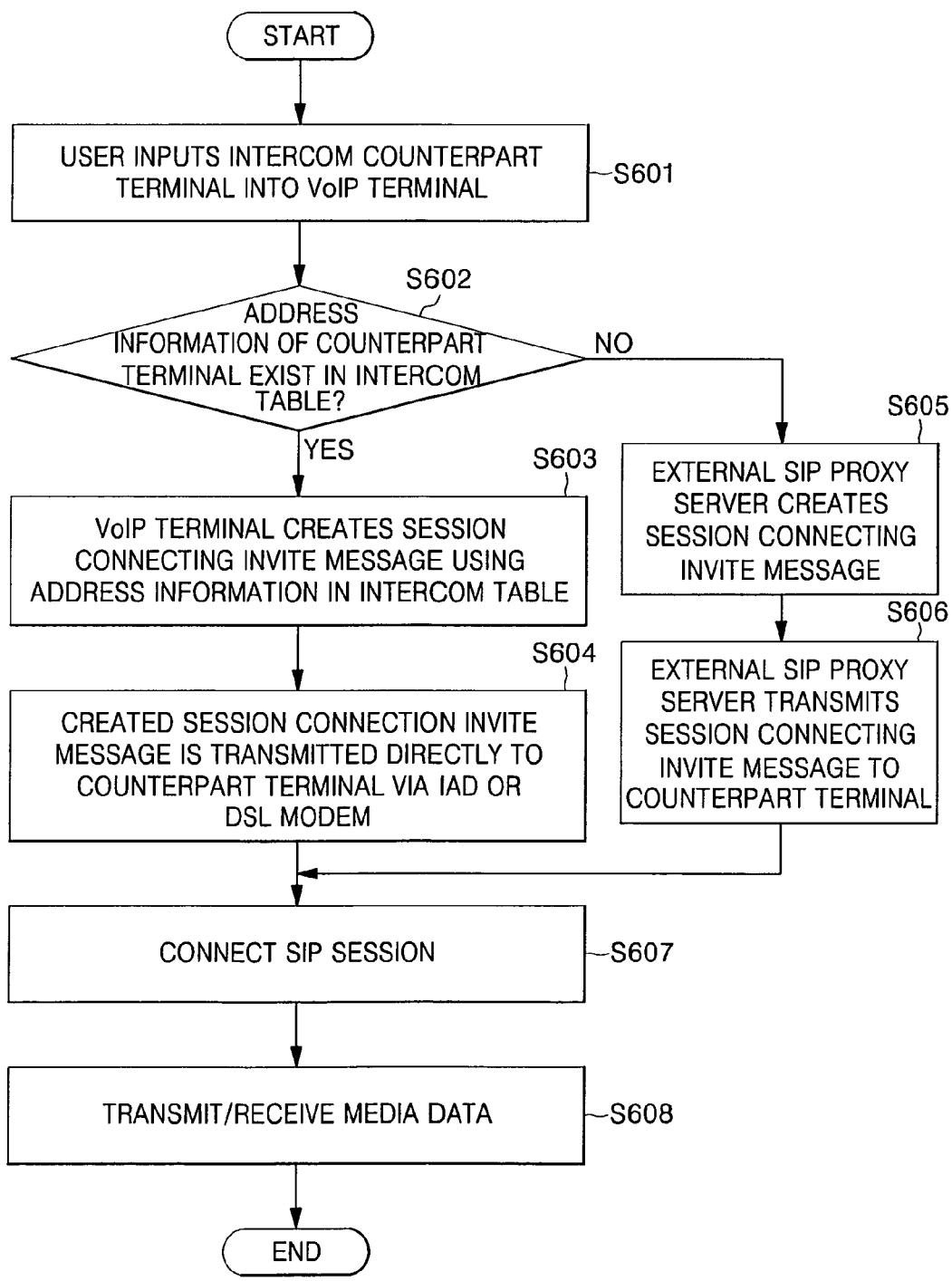
FIG. 6 is a flowchart of an outgoing call process of a VoIP terminal according to an another embodiment of the invention.

FIG. 6 is a flowchart of an outgoing call process of a VoIP terminal according to another embodiment of the invention.

It is assumed that the outgoing call process shown in FIG. 6 is carried out after the intercom terminal table of the VoIP terminal, as shown in FIG. 2, is created.

In step S601, a call receiving intercom terminal with which a user wants to have a telecommunication is inputted to the first VoIP terminal 101. The first VoIP terminal 101 displays terminal information, listed in its own intercom terminal table, so that the user can select one terminal from the displayed terminal information. Accordingly, the receiving terminal can be inputted as a second VoIP terminal to the first VoIP terminal 101. In step S602, the first VoIP terminal 101 determines whether or not address information of the second VoIP terminal exists in an intercom information table.

If address information of the second VoIP terminal 102 exists in the intercom information table, the first VoIP terminal 101 creates a session connecting invite message by itself based upon data from the intercom information table in step S603. In step S604, the created session connecting invite message is transmitted to the second VoIP terminal 102, which is located in the private network, via the IAD or DSL modem 200.

Of course, an SIP session is connected through the transmission of the session connecting invite message in step S607, and media data are transmitted/received between the first and second VoIP terminals 101 and 102, respectively, which correspond to a calling terminal and a receiving terminal, respectively, in step S608.

If the telephone number of the receiving terminal does not exist in the intercom information table as determined in step S602, the VoIP terminal 100 sends a session connection request to the external SIP proxy server 400 which searches for an address of a counterpart terminal and, based upon the determined address, creates a session connecting invite message in step S605. The SIP proxy server 400 then transmits the session connecting invite message to the counterpart terminal so as to establish an SIP session in step S606.

Figure 7:
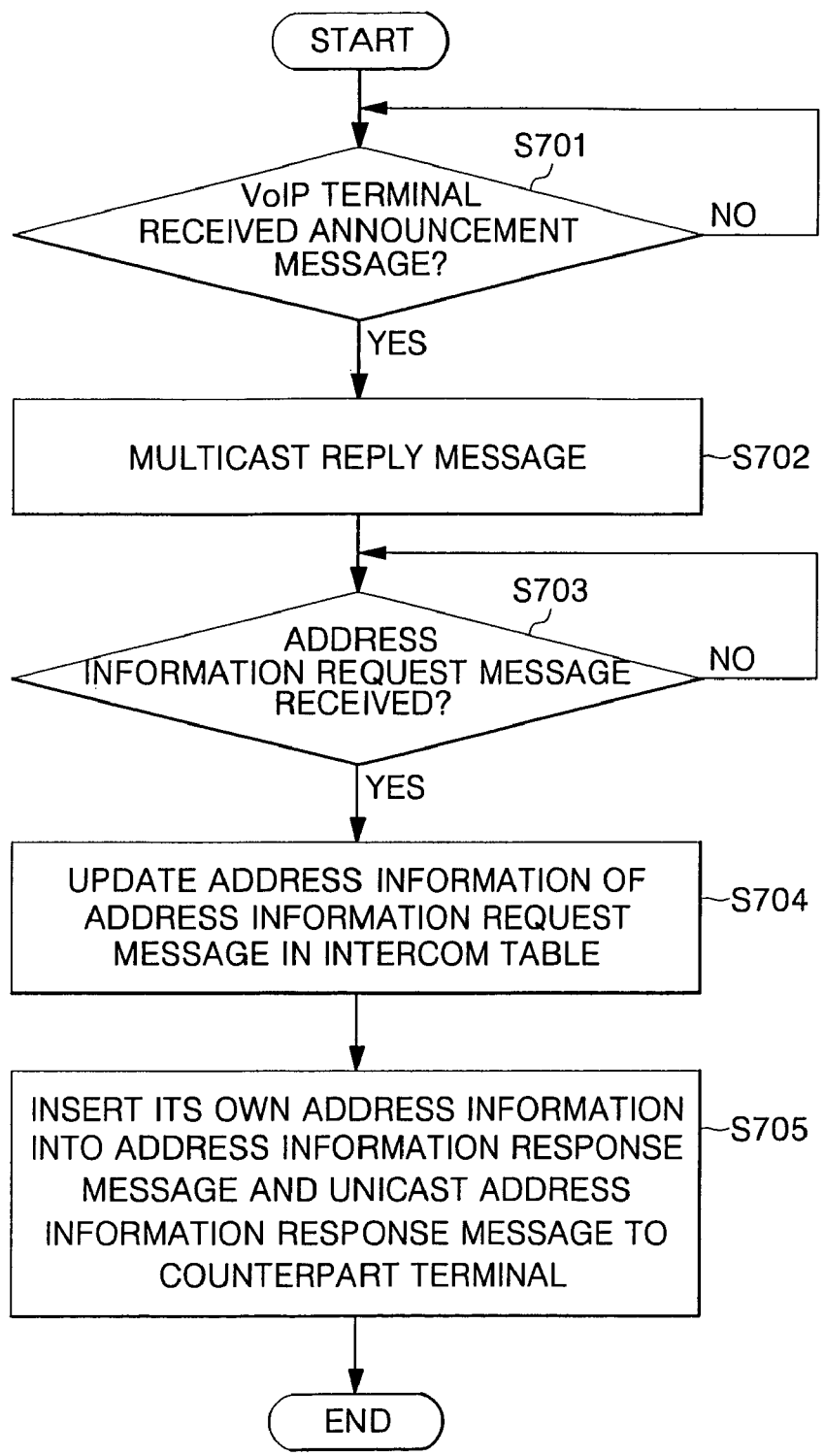
FIG. 7 is a flowchart of an update process of an intercom terminal table according to a further embodiment of the invention.

FIG. 7 is a flowchart of an update process of an intercom terminal table according to a further embodiment of the invention.

A process in which a VoIP terminal creates an intercom terminal table has already been discussed above with reference to FIG. 3. However, it is also necessary to discuss a process for updating an intercom terminal table of a VoIP terminal which already belongs to a private network.

Referring to FIG. 7, in step S701, a first VoIP terminal 101 determines whether or not an announcement message is received from another VoIP terminal, particularly, a second VoIP terminal 102. If the announcement message is received, the first VoIP terminal 101 multicasts a reply message reporting that the first and second VoIP terminals 101 and 102, respectively, belong to the same network in step S702.

After the reply message is multicast, the first VoIP terminal 101 determines whether or not an address information request message is received in step S703. As explained above, the address information request message includes address information of the second VoIP terminal 102, which newly entered the private network.

In step S704, the first VoIP terminal 101 extracts address information of the second VoIP terminal 102 from the address information request message and updates its own intercom terminal table. At the same time, in step S705, the first VoIP terminal 101 inserts its own address information into an address information response message, and unicasts the address information response message to the second VoIP terminal 102. In this case, the address information extracted in step S704 can be used as the address of a counterpart.

Figure 8:
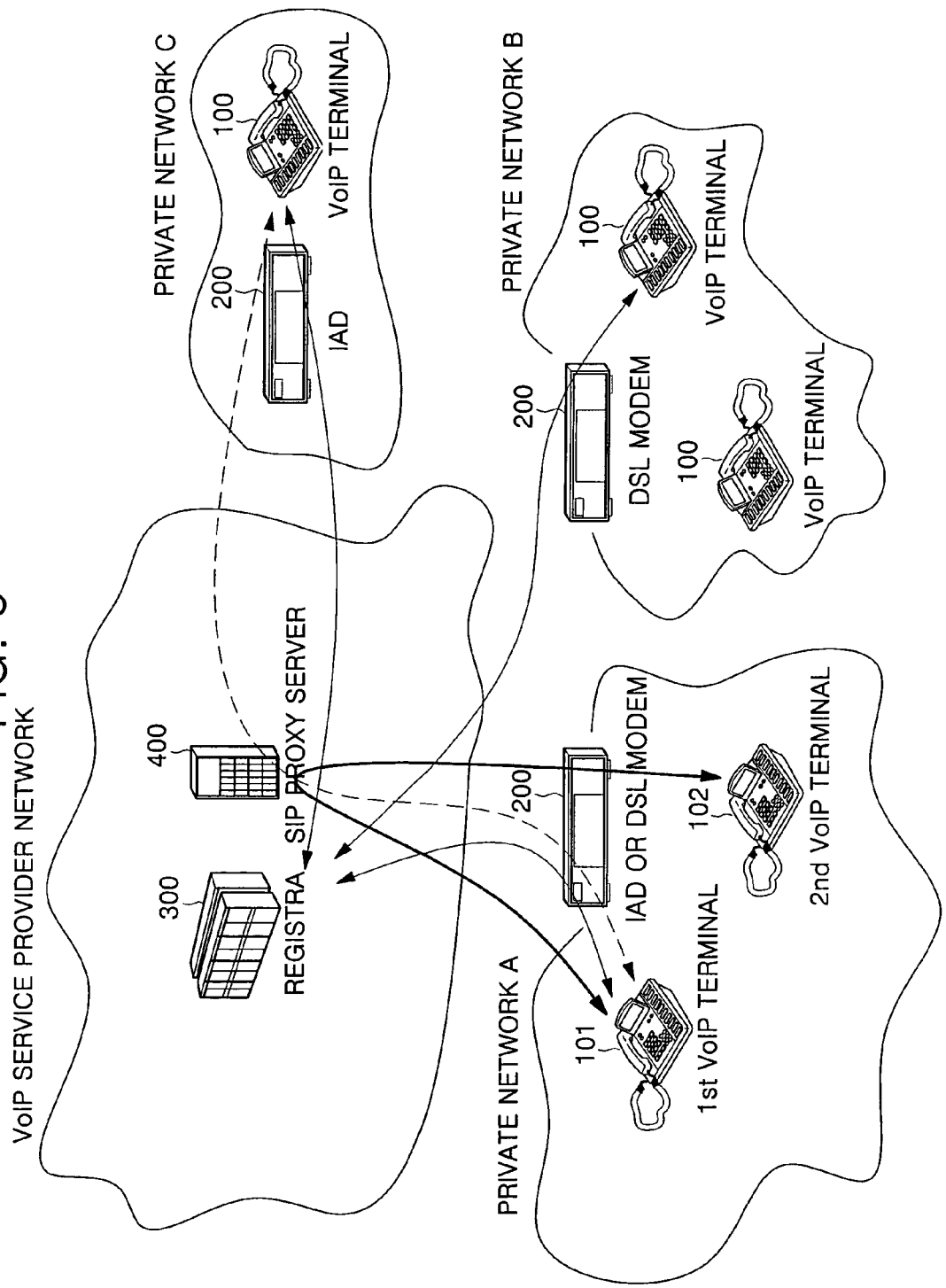
FIG. 8 is a conceptual view of a routing path used in a session connecting process according to the embodiment of the invention shown in FIG. 1.

FIG. 8 is a conceptual view of a routing path used in a session connecting process according to the embodiment of the invention shown in FIG. 1.

More specifically, FIG. 8 generally shows three routing paths, which are depicted by solid lines, a dotted line and a thick solid line, respectively. Each of the solid lines indicates a routing path of a respective register message. The dotted line indicates a routing path of a session connecting message between external terminals. Finally, the thick solid line indicates a routing path of a session connecting message for intercom service.

Of these, the register message is a message which the VoIP terminal 100, belonging to a respective private network, sends to the registra 300 to notify that the VoIP terminal 100 can use a VoIP service. The register message is sent to the registra 300 via the IAD or DSL modem 200.

In relation to session connection between external terminals, the first VoIP terminal 101 calls for the VoIP terminal 100 in the private network C via the SIP proxy server 400. The SIP proxy server 400 generates a session connecting invite message using the address number of a receiving terminal, received from the first VoIP terminal 101, and mapped address information. The session connecting invite message is transmitted to the receiving terminal via the IAD 200 of the private network C.

Finally, of the three types of routing paths, the routing path of a session connecting invite message for an intercom service will be described as follows. When the first VoIP terminal 101 calls for an internal terminal, particularly, the second VoIP terminal 102, a call message is sent to the SIP proxy server 400 via the IAD or DSL modem 200.

The SIP proxy server 400 searches for address information of the receiving terminal, and finds that the receiving terminal belongs to the private network A. Then, the proxy server 400 transmits a session connecting invite message to the second VoIP terminal 102 via the IAD or DSL modem 200. Accordingly, the session connecting invite message for intercom service is sent through the routing path.

Figure 9:
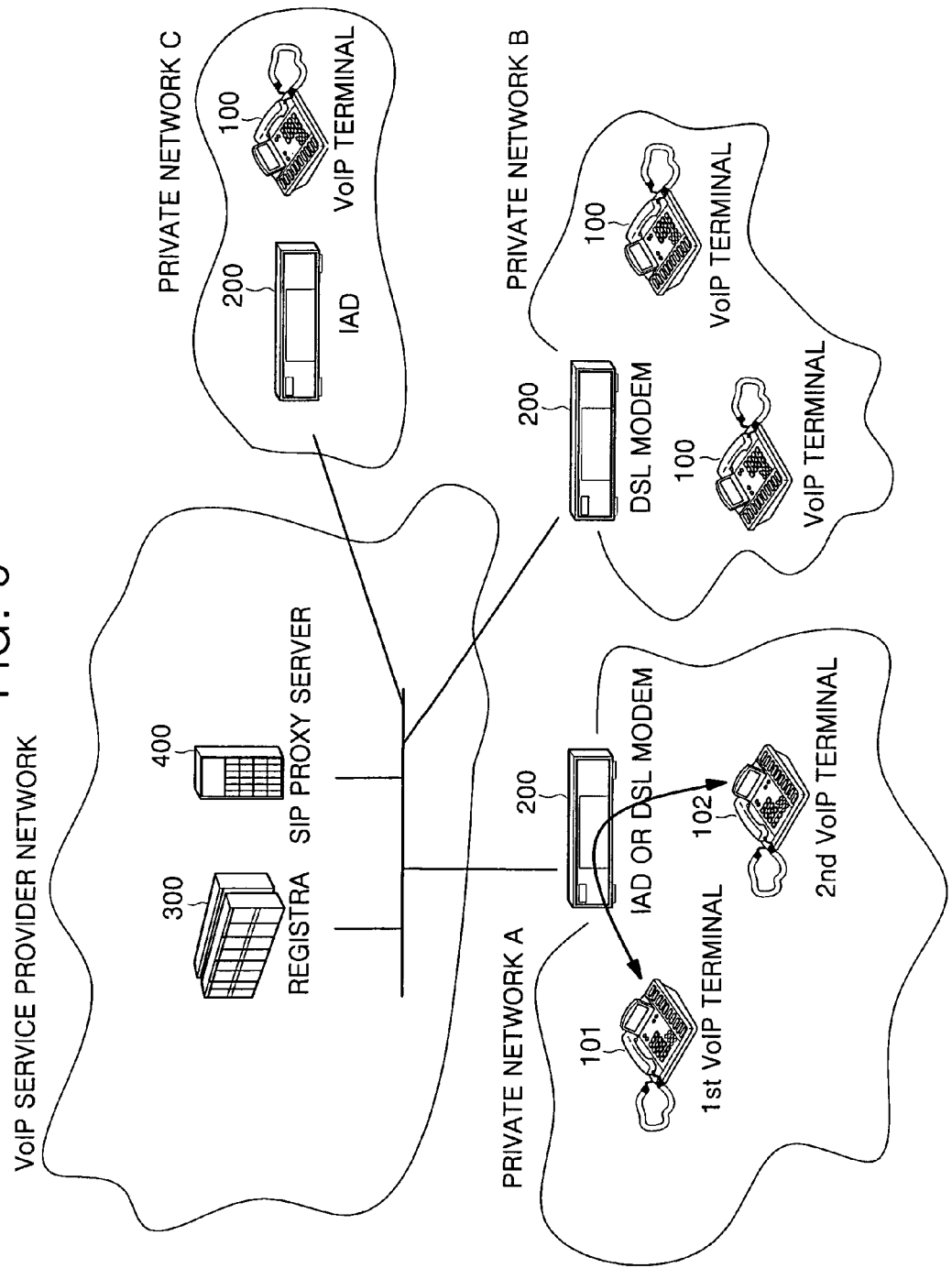
FIG. 9 is a conceptual view of a routing path used in a session connecting process according to the embodiment of the invention shown in FIG. 3.

FIG. 9 is a conceptual view of a routing path used in a session connecting process according to the embodiment of the invention shown in FIG. 3.

It is apparent that a message is not sent to the registra 300 and the SIP proxy server 400 when the first VoIP terminal 101 calls for the second VoIP terminal 102. This is because the first VoIP terminal 101 determines the VoIP terminal as belonging to the private network A using an intercom information table as illustrated in FIG. 5, and creates a session connecting invite message by itself based upon that determination.

The session connecting invite message, created by the first VoIP terminal 101, is sent to the second VoIP terminal 102 only via the IAD or DSL modem 200, which acts as a hub of the private network A. Since the session connecting invite message does not pass through the external SIP proxy server 400, it is possible to shorten the time period consumed in the session connecting process, as well as to reduce the load on the SIP proxy server 400.

According to the present invention as set forth above, the VoIP terminal, at the time of initialization, multicasts an announcement message so as to search for a terminal with which to intercommunicate, and creates an intercom terminal table using a reply responsive to the announcement message. The VoIP terminal creates a session connecting invite message by itself without participation of an external proxy server, and transmits the session connecting invite message directly to an internal, counterpart VoIP terminal only via an IAD or DSL modem, which acts as a hub of a private network. Accordingly, there is an advantage in that the session connecting invite message for intercom service does not go through the external SIP proxy server.

While the present invention has been shown and described in connection with the preferred embodiments, it will be apparent to those skilled in the art that modifications and variations can be made without departing from the spirit and scope of the invention as defined by the appended claims. For example, the present invention proposes intercom service by adopting the SIP among various protocols which support VoIP telecommunication. However, in addition to the SIP, other protocols such as H.323, MGCP and Megaco/H.248 can be used for VoIP session connection. It is apparent to those skilled in the art that the intercom service of the invention can be provided using any of these protocols.

What is claimed is:

1. A Voice over Internet Protocol (VoIP) terminal supporting an intercom service, comprising:
    a VoIP terminal announcement module to perform an announcement process by broadcasting address information of the VoIP terminal to other terminals connected to the same network the VoIP terminal is connected to, and to acquire address information of said other terminals; and
    a call controller which, when the VoIP terminal announcement module acquires the address information comprising information of a counterpart terminal, provides an intercom service by sending a session connecting invite message to said counterpart terminal using the acquired address information of the counterpart terminal,
    wherein the VoIP announcement module multicasts an address information request message comprising the address information of the VoIP terminal, and receives an address information response message comprising the address information of said other terminals in the same network, thereby acquiring the address information of said other terminals.

2. The VoIP terminal according to claim 1, further comprising an intercom terminal table to store the address information of said other terminals acquired by the VoIP terminal announcement module.

3. The VoIP terminal according to claim 2, wherein the intercom terminal table comprises information of said other terminals, the information comprising at least one of Identification (ID) information, Internet Protocol (IP) address information, Session Initiation Protocol (SIP) port information, and status information.

4. The VoIP terminal according to claim 1, wherein each of the address information request message and the address information response message comprises at least one of a message ID field, a terminal ID field, a terminal IP address type field, a terminal address field, an SIP port number field, a status information field, and a checksum field.

5. The VoIP terminal according to claim 4, wherein the address information request message and the address information response message are divided based on a code value of the message ID field.

6. The VoIP terminal according to claim 1, wherein the VoIP terminal announcement module sends a session connecting invite message to said counterpart terminal via an external proxy server in response to not acquiring the address information of said counterpart terminal.

7. The VoIP terminal according to claim 1, wherein the VoIP terminal announcement module carries out a terminal announcement process when the VoIP terminal is powered on.

8. The VoIP terminal according to claim 1, further comprising a user SIP module to display information of said other terminals in the same network, acquired by the terminal announcement process, and to receive a call origination request for at least one of said other terminals with respect to which said information is displayed.

9. A Voice over Internet Protocol (VoIP) network supporting an intercom service, comprising:
    a VoIP terminal to perform an announcement process by broadcasting its address information to other terminals connected to the same network the VoIP terminal is connected to, to acquire address information of said other terminals, and to provide an intercom service by sending a session connecting invite message to a counterpart terminal using the acquired address information of said counterpart terminal; and
    an external proxy server which, upon receiving a session connecting invite message to be sent to an external terminal from the VoIP terminal, searches for address information of said external terminal, and to control a call session connection between the VoIP terminal and said external terminal using the address information of said external terminal,
    wherein the VoIP terminal multicasts an address information request message comprising the address information of the VoIP terminal, and receives an address information response message comprising the address information of said other terminals, thereby acquiring the address information of said other terminals.

10. The VoIP network according to claim 9, wherein the VoIP terminal comprises an intercom terminal table comprising information of said terminals connected to the same network, the information comprising at least one of Identification (ID) information, Internet Protocol (IP) address information, Session Initiation Protocol (SIP) port information, and status information.

11. The VoIP network according to claim 9, wherein each of the address information request message and the address information response message comprises at least one of a message ID field, a terminal ID field, a terminal IP address type field, a terminal address field, an SIP port number field, a status information field, and a checksum field.

12. A method of establishing a Voice over Internet Protocol (VoIP) session supporting an intercom service, the method comprising:
    at a VoIP terminal, performing an announcement process by broadcasting address information of the VoIP terminal to other terminals connected to the same network the VoIP terminal is connected to, and acquiring address information of said other terminals; and
    at the VoIP terminal, when the VoIP terminal announcement module acquires the address information comprising information of a counterpart terminal, sending a session connecting invite message to the counterpart terminal using the acquired address information of said counterpart terminal,
    wherein the announcement process comprises:
        at the VoIP terminal, broadcasting an announcement message and determining whether a reply message responsive to the announcement message exists;
        at the VoIP terminal, in response to determining existence of the reply message responsive to the announcement message, multicasting an address information request message comprising terminal information of the VoIP terminal; and
        in response to receiving the address information request message, transmitting, by the counterpart terminal belonging to the same network, to the VoIP terminal, an address information response message comprising address information of the counterpart terminal belonging to the same network.

13. The method according to claim 12, further comprising at the VoIP terminal, storing, in an intercom terminal table, the address information of the counterpart terminal in the received address information response message.

14. The method according to claim 13, wherein the intercom terminal table comprises information of terminals, the information comprising at least one of Identification (ID) information, Internet Protocol (IP) address information, Session Initiation Protocol (SIP) port information, and status information.

15. The method according to claim 12, wherein each of the address information request message and the address information response message comprises at least one of a message ID field, a terminal ID field, a terminal IP address type field, a terminal address field, an SIP port number field, a status information field, and a checksum field.

16. The method according to claim 12, further comprising at the VoIP terminal, in response to not acquiring address information matching the information of said counterpart terminal, sending a session connecting invite message to said counterpart terminal via an external proxy server.

17. The method according to claim 12, further comprising:

at the VoIP terminal, displaying information of said other terminals in the same network, acquired by the terminal announcement process; and receiving a call origination request for at least one of said terminals with respect to which said information is displayed.

* * * * *